United States Patent
Choi et al.

(10) Patent No.: US 10,295,993 B2
(45) Date of Patent: May 21, 2019

(54) METHOD AND SYSTEM FOR DETECTING AND CORRECTING PROBLEMATIC ADVANCED PROCESS CONTROL PARAMETERS

(75) Inventors: Dongsub Choi, Yongin (KR); David Tien, Santa Clara, CA (US)

(73) Assignee: KLA-Tencor Corporation, Milpitas, CA (US)

(*) Notice: Subject to any disclaimer, the term of this patent is extended or adjusted under 35 U.S.C. 154(b) by 703 days.

(21) Appl. No.: 13/597,944

(22) Filed: Aug. 29, 2012

(65) Prior Publication Data

US 2013/0060354 A1    Mar. 7, 2013

Related U.S. Application Data

(60) Provisional application No. 61/530,093, filed on Sep. 1, 2011.

(51) Int. Cl.
    G05B 13/02    (2006.01)
    G05B 19/418   (2006.01)
    G05B 13/04    (2006.01)

(52) U.S. Cl.
    CPC ....... G05B 19/41875 (2013.01); G05B 13/04 (2013.01); G05B 2219/32018 (2013.01);
    (Continued)

(58) Field of Classification Search
    USPC ........................................................ 700/51
    See application file for complete search history.

(56) References Cited

U.S. PATENT DOCUMENTS

5,642,296 A  *  6/1997  Saxena ................. H01L 22/20
                                                       216/84
7,127,304 B1 * 10/2006  Gould et al. ................... 700/20
(Continued)

FOREIGN PATENT DOCUMENTS

CN    101535898 A    9/2009
JP    2003173948 A    6/2003
(Continued)

OTHER PUBLICATIONS

Rodriguez et al., "Effective Applications of Control Charts Using SAS Software" Short Course Presentation 22nd SAS Users Group International Conference San Diego Mar. 16-19, 1997, pp. 1-145.*
(Continued)

*Primary Examiner* — Emilio J Saavedra
(74) *Attorney, Agent, or Firm* — Suiter Swantz pc llo (57) ABSTRACT

The invention may be embodied in a system and method for monitoring and controlling feedback control in a manufacturing process, such as an integrated circuit fabrication process. The process control parameters may include translation, rotation, magnification, dose and focus applied by a photolithographic scanner or stepper operating on silicon wafers. Overlay errors are used to compute measured parameters used in the feedback control process. Statistical parameters are computed, normalized and graphed on a common set of axes for at-a-glance comparison of measured parameters and process control parameters to facilitate the detection of problematic parameters. Parameter trends and context relaxation scenarios are also compared graphically. Feedback control parameters, such as EWMA lambdas, may be determined and used as feedback parameters for refining the APC model that computes adjustments to the process control parameters based on the measured parameters.

31 Claims, 8 Drawing Sheets

(52) U.S. Cl.
CPC .............. *G05B 2219/32191* (2013.01); *G05B 2219/42001* (2013.01); *G05B 2219/45031* (2013.01); *Y02P 90/22* (2015.11)

(56) References Cited

U.S. PATENT DOCUMENTS

| | | | |
|---|---|---|---|
| 7,200,459 B1 | 4/2007 | Bode et al. | |
| 7,608,468 B1 | 10/2009 | Ghinovker et al. | |
| 2005/0171626 A1* | 8/2005 | Schwarm | G05B 23/0294 700/108 |
| 2005/0221514 A1* | 10/2005 | Pasadyn | G05B 11/42 438/14 |
| 2008/0057418 A1 | 3/2008 | Seltmann et al. | |
| 2008/0133163 A1 | 6/2008 | Shanmugasundram et al. | |

FOREIGN PATENT DOCUMENTS

| | | |
|---|---|---|
| JP | 2007531305 A | 11/2007 |
| JP | 2008166755 A | 7/2008 |
| JP | 2008542790 A | 11/2008 |
| JP | 2010093272 A | 4/2010 |
| JP | 2010267931 A | 11/2010 |
| JP | 2011071296 A | 4/2011 |
| JP | 2012207801 A | 10/2012 |
| KR | 10-0724186 B1 | 5/2007 |
| WO | WO 01-11678 A1 | 2/2001 |

OTHER PUBLICATIONS

Crow et al, "Enhancement of Photolithographic Performance by Implementing an Advanced Process Control System" Proceedings of the SPIE, vol. 5378, (2004), p. 192-203.*

Wu et al., "Performance Analysis of EWMA Controllers Subject to Metrology Delay" IEEE Transactions on Semiconductor Manufacturing, Aug. 2008, vol. 21, No. 3 pp. 413-425.*

Patel et al., "Adaptive Optimization of Run-to-Run Controllers: The EWMA Example" IEEE Transactions on Semiconductor Engineering, Feb. 2000, vol. 13, No. 1 pp. 97-107.*

CamLine GmbH, "LineWorks products" Catalog 2006, 100 pages.*

Vanli et al., "Model Context Selection for Run-to-Run Control" IEEE Transactions on Semiconductor Manufacturing, vol. 20, No. 4, Nov. 2007, pp. 506-516.*

Laidler et al., "Knowledge Based APC Methodology for Overlay Control" Proc. SPIE. 5044, Advanced Process Control and Automation, 32. (Jun. 30, 2003) pp. 32-43.*

Laidler et al., "A Single Metrology Tool Solution for Complete Exposure Tool Setup" Proc. SPIE. 7638, Metrology, Inspection, and Process Control for Microlithography XXIV, 763809. (Mar. 11, 2010) 10 pgs.*

Guo et al., "An EWMA-based process mean estimator with dynamic tuning capability" IEE transactions vol. 34 2002 pp. 573-582.*

Sreenivasan et al., "Run to Run Control in tungsten chemical vapor deposition using H2/WF6 at low pressures" Journal of Vacuum Science Technology vol. 18 No. 5 2001 pp. 1931-1941.*

Gopalachary, "A Statistical Approach to Automatic Process Control (Regulation Schemes)"Ph. D. Thesis, Victoria University of Technology, Mar. 1997, 276 pgs.*

Stefani et al., "Advanced Process Control of a CVD Tungsten Reactor" IEEE Transactions on Semiconductor Manufacturing, vol. 9 No. 3, Aug. 1996, p. 366-383.*

Robert N. Rodriguez, Effective Applications of Control Charts Using SAS Software, Short Course Presentation 22nd SAS Users Group International Conference, San Diego, Mar. 16-19, 1997, pp. 1-145.

Gary E. Flores et al., Process Control of Stepper Overly Using Multivariate Techniques, OCG Interface '95, 1995, KP055278595, Retrieved from the Internet: URL: http://www.ultratech.com/pdf/ocg95mul.pdf. [retrieved on Jun. 8, 2016], 17 pages.

EP Search Report for EP 12828638.2 dated Jun. 30, 2016, 12 pages.

Office Action dated Feb. 27, 2018 for Japanese Patent Application No. 2017-075583.

Office Action dated Oct. 9, 2018 for Japanese Patent Application No. 2014-528577.

* cited by examiner

METHOD AND SYSTEM FOR DETECTING AND CORRECTING PROBLEMATIC ADVANCED PROCESS CONTROL PARAMETERS

CROSS-REFERENCE TO RELATED APPLICATION

The present application is related to and claims the benefit of the earliest available effective filing date(s) from the following listed application(s) (the "Related Applications") (e.g., claims earliest available priority dates for other than provisional patent applications or claims benefits under 35 USC § 119(e) for provisional patent applications, for any and all parent, grandparent, great-grandparent, etc. applications of the Related Application(s)).

Related Applications

For purposes of the USPTO extra-statutory requirements, the present application constitutes a regular (non-provisional) patent application of United States Provisional Patent Application entitled METHOD TO DETECT PROBLEMATIC APC FEEDBACK PARAMETERS, naming Dongsub Choi and David Tien, as an inventor, filed Sep. 1, 2011 Application Ser. No. 61/530, 093.

TECHNICAL FIELD

The present invention relates to integrated circuit manufacture and, more particularly, to a method for monitoring and controlling feedback parameters in an integrated circuit manufacturing process.

BACKGROUND

Advanced process control (APC) systems are presently used to implement feedback control in integrated circuit (IC) manufacturing processes. The IC manufacturing processes typically includes a wafer processing tool (e.g., scanner or stepper) suitable for forming a series of desired pattern layers in a wafer (e.g., silicon wafer) in order to create an IC device. The fabrication process may be governed by a number of process control parameters applied by the process tool at each step of the fabrication process. These process control parameters may include, but are not limited to, the translation rate of the wafer across the process tool (scanner or stepper), the rotation angle of the wafer with respect to the process tool, the dose of radiation applied to the wafer by the process tool, the magnification of the source pattern (reticle) by the process tool, and the focus source pattern on the wafer by the process tool. The APC system automatically controls one or more of these process control parameters, in real time or near real time, to counteract errors measured in the scanned pattern as the pattern formation process proceeds from layer to layer.

A metrology system is used to monitor the patterns scanned onto the wafers as the IC fabrication process proceeds so that adjustments can be made to counteract errors that may develop during the manufacturing process. More specifically, the metrology system typically determines the positions of certain reference marks (metrology targets) disposed in each process layer of a device. Misalignment between the reference marks from layer to layer, known as "overlay error," may be measured and used to compute the feedback parameters used to control the process tool, allowing for ongoing feedback regulation of the fabrication process.

It should be appreciated, however, that the overlay errors are indicative of, but are not identical to, the specific process control parameters used by the scanner or stepper to control the IC fabrication process. In particular, the overlay errors represent layer-to-layer positional misalignment in between two metrology reference marks, whereas the process control parameters (e.g., translation, rotation, dose, magnification and focus) govern the operation of the scanner or stepper producing the layers. Therefore, a process control model is ordinarily used to compute prospective corrections to the process control parameters (correctables) based on the measured overlay error.

While this is a highly successful IC fabrication technique, the computation of the control parameters has traditionally been a "black box" to the technicians, with the inner workings of the APC system, such as the underlying overlay errors and measured parameters, unavailable for view or analysis. This makes it difficult for the technicians to understand how the IC fabrication systems are behaving to help identify problematic process control parameters and develop model changes to counteract problems and develop improvements to the feedback control system. As a result, errors within an APC system can be difficult to diagnose and correct.

There is, therefore, a continuing need for methods and systems for monitoring and controlling feedback control parameters used in IC device manufacture. More particularly, there is a continuing need for techniques for exposing information about the inner workings of APC systems used for automatic feedback control of process control parameters in integrated circuit device fabrication.

SUMMARY

The invention may be embodied in an APC monitoring and control system for computing and displaying statistics associated with feedback control parameters in APC systems. It should be understood that the present invention may be applied to feedback control of manufacturing processing in general, and the IC fabrication represents, but does not limit the invention, one particular embodiment of the invention. In this particular example of the invention, the APC monitoring and control system may compute and display graphs showing statistical parameters, such as means and deviations, of measured parameters typically along with applied and/or refined process control parameters reflective of the overlay errors physically measured during the IC fabrication process.

In a particular embodiment, the APC monitoring and control system computes and displays graphs showing the means plus the deviations [m+n* sigma] of the measured parameters and/or the deviations [n*sigma] of the refined process control parameters for a selected set of selected process control parameters, referred to as the analysis data set (e.g., translation, rotation, magnification, dose and focus) that are used a feedback control parameters in the IC fabrication process.

In another aspect of the invention, the APC monitoring and control system computes and displays graphs showing trends over time (i.e., process control parameters for successive lots of wafers) of the measurements values along with the applied and/or refined process control parameters for the selected set of process control parameters (analysis data set).

In another aspect of the invention, the APC monitoring and control system may also compute and display trends reflective of comparisons over time of ideal parameters based for selected context relaxation scenarios.

In another aspect of the invention, the APC monitoring and control system may also compute preferred feedback control parameters (referred to as "lambdas" in an EWMA context) that are used to determine process control feedback adjustments in an autoregressive correlation process that takes into account trends occurring in the process control parameters over time. For example, analysis and potential refinement of the model parameters may be implemented by adjusting the feedback control parameters used to compute the measured parameters based on overlay errors occurring between successive lots of wafers, wafers, or layers of wafers during the fabrication process.

In particular, preferred feedback control values may be selected through continually updated historical data and provided to the APC system in real time or near real time for use in computing the actual adjustments to the process control parameters from the measured parameters, which in turn are based on the overlay errors physically measured by the metrology system. In addition, the feedback control parameters may weigh parameters (typically referred to as "lambdas") in an Exponentially Weighted Moving Average (EWMA) autoregressive feedback control process. Preferred EWMA lambdas may be selected through the iterative computation of difference indexes corresponding to virtual revised process control parameters computed from candidate lambda sets and a continually updated historical set of process control parameters and measured parameters occurring over time until the solution converges on a preferred set of lambdas. The preferred set of lambdas are then entered (fed back) into the APC model, where they are used to compute the revised process control from the measured parameters going forward.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE FIGURES

The numerous advantages of the invention may be better understood with reference to the accompanying figures in which.

DETAILED DESCRIPTION OF ILLUSTRATIVE EMBODIMENTS

Reference will now be made in detail to the subject matter disclosed, which is illustrated in the accompanying drawings. The invention may be embodied in a system and method for monitoring and controlling feedback control in a fabrication process, such as a photolithographic integrated circuit fabrication process. The process control parameters in the photolithographic system include, but are not limited to, translation, rotation, magnification, dose and focus applied by a photolithographic scanner or stepper operating on a given wafer (e.g., silicon wafer). Overlay error measurements are used to compute measured parameters used in the feedback control process. These prospective corrections are statistically analyzed and used to determine the refined process control parameters to implement feedback control of the process control parameters applied by the scanner or stepper. The process control variables actually applied by the scanner or stepper for a particular layer are referred to in this disclosure as the "applied process control parameters," the prospective corrections to the process control parameters are typically referred to as the "measured parameters," while the "refined process control variables" refer to the modified process control parameters for use by the scanner or stepper for the next layer.

The feedback control process described is complicated by the fact that the overlay errors measured by metrology system, and therefore the prospective changes to the process control parameters computed to offset the measured overlay errors (measured parameters), are not represented by a single set of values for the layer. Rather, a set of overlay errors is determined for each metrology target, for each increment from one layer to the next. The process model, in turn, aggregates and statistically analyzes the overlay errors to determine composite adjustment values (measured parameters) to the process control parameters (i.e., a single adjustment value for each process control parameters for the next successive layer) based on the overlay errors provided by the metrology system. The measured parameters are then used to compute the revised process control parameters (e.g., revised translation, rotation, magnification, dose and focus parameters) in real time or near real time to control the scanner or stepper. This process may be performed iteratively for lots of wafers, individual wafers, or successive layers of individual wafers.

As noted above, the process control parameters used in a given process layer are typically referred to as the "applied (used) process control parameters," while the changes to those parameters intended to offset the overlay errors supplied by the metrology system are generally referred to as the "measured parameters." The corrected process control parameters, referred to in this specification as the "refined process control parameters," can be computed as the applied process control parameters plus or minus measured parameters (corrections to the applied process control parameters). However, this correlation is complicated by the fact that the overlay errors used to compute the measured parameters may vary in both the x- and y-dimensions and from layer to layer of the wafer. Changes in one control parameter can also affect the measured value for other parameters, resulting in covariance among the parameters. The process control parameters also tend to drift from lot to lot (i.e., as function of time or process quantity) and may also vary in response to tool wear and changing environmental conditions. As a result, finding the best adjustments to the process control parameters in real time or near real time is a complicated task that cannot be expected to perfectly eliminate all of the overlay errors as lot after lot of IC devices are manufactured.

To meet this challenge, APC systems have been developed to compute the refined process control parameters from the applied process control parameters and the measured parameters, and to feedback the refined process control parameters, in real-time or near-real-time. For example, the process control parameters may be refined between successive lots, wafers, or layers of individual wafers, in a feedback control scheme. During this process, a single set of refined process control parameters is typically computed by the APC system and used for each successive lot, wafer or layer in the IC fabrication process. The presented invention is directed to methods and systems for monitoring and controlling feedback control parameters used in IC device manufacture.

In one aspect of the present invention, statistical parameters are computed, normalized and graphed on a common set of axes for at-a-glance comparison of measured parameters and process control parameters to facilitate the detection of problematic parameters. Parameter trends and context relaxation scenarios are also compared graphically. Feedback control parameters, such as EWMA lambdas, may be determined and used as feedback parameters for refining the APC model that computes adjustments to the process control parameters based on the measured parameters.

Referring generally to FIGS. 1 through 9, a system and method for monitoring and controlling a feedback control process for a fabrication process is described in accordance with the present disclosure. A particular example of the invention is directed to a photolithographic integrated circuit fabrication process. It will be appreciated that this is but one potential embodiment of the invention, which illustrates a preferred embodiment of the invention but does not limit the invention to this particular embodiment.

Figure 1:
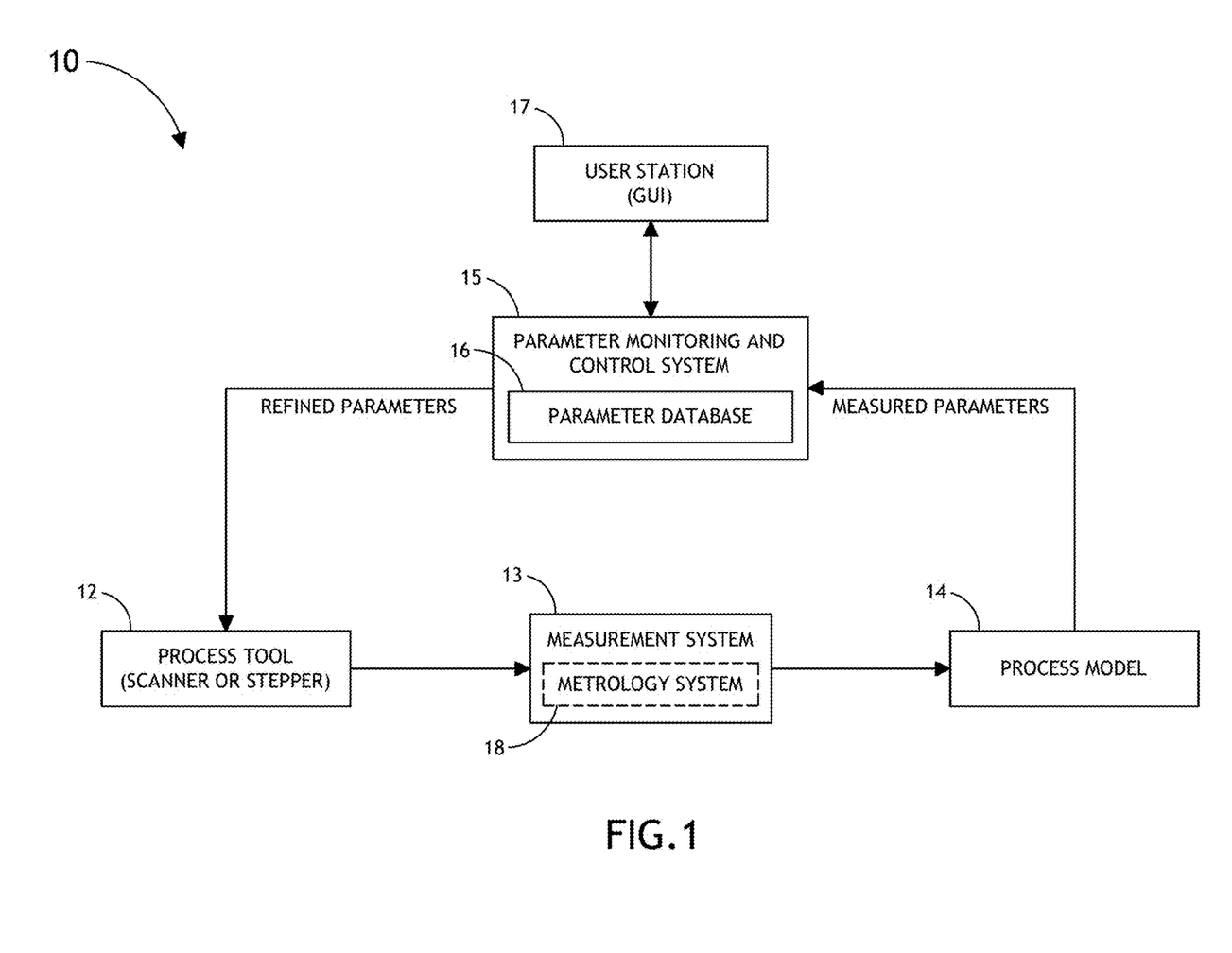
FIG. 1 is a block diagram of an integrated circuit fabrication process with a feedback parameter monitoring and control system.

FIG. 1 is a block diagram of a manufacturing system 10 and an associated process with a feedback parameter monitoring and control system 15. FIG. 1 further illustrates a particular embodiment, which is a photolithographic system for manufacturing integrated circuits from silicon wafers. The system 10 includes a process tool 12 that operates on a substrate. In the particular photolithographic example, the process tool may be a photolithographic scanner or stepper that imposes an integrated circuit pattern onto a silicon wafer through a series of layers. The process tool uses a number of adjustable control parameters when operating on the substrate. In the particular photolithographic example, the adjustable process control parameters include one or more of the translation rate of the wafer across the scanner or stepper, the rotation angle of the wafer with respect to the scanner or stepper, the dose of radiation applied to the wafer by the scanner or stepper, the magnification of the source pattern (reticle) onto the wafer by the scanner or stepper, and the focus of source pattern onto the wafer by the scanner or stepper (translation, rotation, dose, magnification, and focus).

The system 10 also includes a measurement system 13, which determines physical measurements associates with the substrate. In the particular photolithographic example, the measurement system may include a metrology system suitable for measuring physical overlay errors associated with the metrology targets of successive process layers of fabrication process.

The system 10 further includes a process model 14 that computes measured parameters based on the physical measurements provided by the measurement system 13 (metrology system 18). It is noted herein that these measured parameters may be referred to as modeled process control parameters. In the particular photolithographic example, the process model 14 may determine potential process tool corrections (measured parameters) based on the measured overlay errors quantified by the metrology system 18 of the system 10.

The system 10 further includes a parameter monitoring and control system 15 that automatically adjusts the process control parameters through an automated feedback process control scheme. In the particular photolithographic example, the parameter monitoring and control system 15 is known as an Advanced Process Control (APC) system, which implements automatic feedback control for the IC fabrication process. In a further aspect, the parameter monitoring and control system 15 includes a parameter database 16. The parameter database 16 may include process control data used in the feedback control process. In the particular photolithographic example, the APC database includes applied process control parameters, measured parameters, and refined process control parameters compiled over multiple lots of wafers operated on by the scanner or stepper.

According to the present invention, the parameter monitoring and control system 15 may also determine and present (i.e., graph) statistical parameters for display on a graphical user interface of a user station 17. In the particular photolithographic example, a first set of statistical parameters may include normalized means and deviations (i.e., m+n*sigma) of the measured parameters. A second set of statistical parameters may include deviations (i.e., n*sigma) for the refined process control parameters. These statistical parameters may be specified by a user through the user station 17. The specific process control parameters specified in the analysis data set include one or more of the scanner or stepper process control variables, such as translation, rotation, magnification, dose and focus. The process control parameters and/or measured parameters specified by the user for a selected analysis data set are preferably normalized and displayed on a common axis. In particular, the parameters may be normalized by expression in percent of mean and percent error or a common unit, such as nm. Additional statistical parameters may include parameter tend and context relaxation graphs extending over multiple groups of the substrate, such as multiple successive lots of silicon wafers.

Graphs comparing the statistical parameters are displayed through a graphical user interface of the user station 17 in a convenient format allowing a user to efficiently view and compare the statistical parameters, thereby facilitating the identification of problematic parameters and associated corrective actions based on the statistical parameters. The user station 17 may also be utilized to enter user data configured to control the parameter monitoring process. In the particular photolithographic example, the user input may include the selection of an analysis data set, which is a selection of the process control parameters and/or associated measured parameters (translation, rotation, magnification, dose and focus) for monitoring and potential feedback control. The user input may also include definitions for displaying parameter trends (e.g., specific wafer lots to be included in the parameter trend graphs) and context relaxation data for use in determining and graphing context relaxation scenarios (e.g., specific context scenarios to be graphically analyzed, such as IC devices fabricated from the same scanner or stepper, measured parameters computed from the same layer, measured parameters computed at the magnification or focus setting, and so forth).

The user station 17 may also be utilized to compute specific feedback control parameters for entry into the parameter monitoring and control system 15. In the particular photolithographic example, the feedback control parameters may include EWMA weighting parameters (referred to as "lambdas" in the established EWMA lexicon), which may be selected through an iterative analysis process that determines a set of lambdas that produce a lowest difference index. In particular, preferred EWMA lambdas may be selected through the iterative computation of difference indexes corresponding to virtual revised process control parameters computed from candidate lambda sets and a continually updated historical set of process control parameters and measured parameters occurring over time until the solution converges on a preferred set of lambdas. The preferred set of lambdas are then entered (fed back) into the APC model, where they are used to compute the revised process control from the measured parameters going forward.

Figure 2:
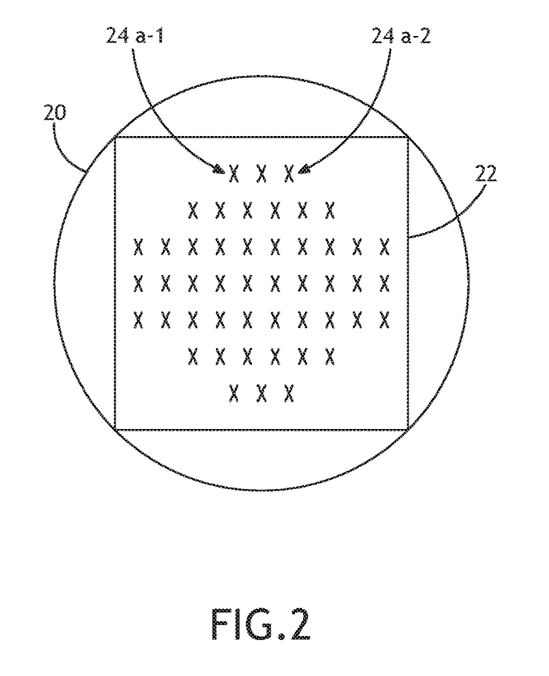
FIG. 2 is a conceptual illustration of an IC pattern with metrology targets on a wafer in the integrated circuit fabrication process.

Although the remaining description will refer only to the specific photolithographic example, those skilled in the art will understand how to readily adapt the techniques of the invention illustrated through this example to other feedback controlled fabrication processes. FIG. 2 is a conceptual illustration of a silicon wafer 20, an IC pattern 22 to be scanned onto the wafer, and metrology targets disposed in the various layers process layers of the wafer 20, which are used for monitoring and implementing feedback control of the IC fabrication process. It is noted herein that any overlay metrology measurement process known in the art may be implemented in the context of the present invention. For descriptive convenience, two of the metrology targets are called out: metrology target 24a-1 at location (X1, Y1) and metrology target 24a-2 at location (X2, Y2). It will be understood that numerous metrology targets are defined over each two-dimensional layer of the IC pattern at different locations (x- and y-dimensions), which are laid down through a series of layers in the photolithographic process.

Figure 3:
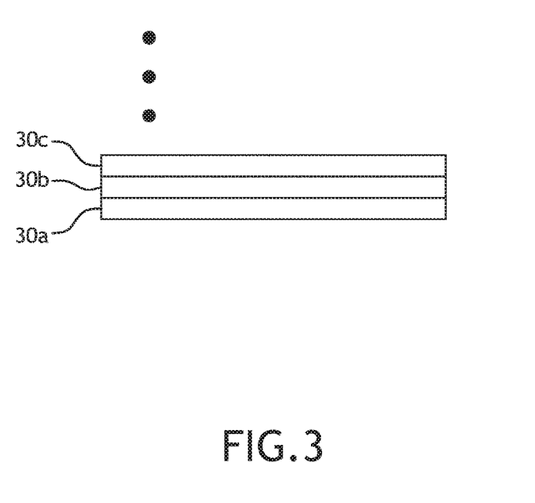
FIG. 3 is a conceptual illustration of successive layer imposed onto a wafer in the integrated circuit fabrication process.
Figure 4:
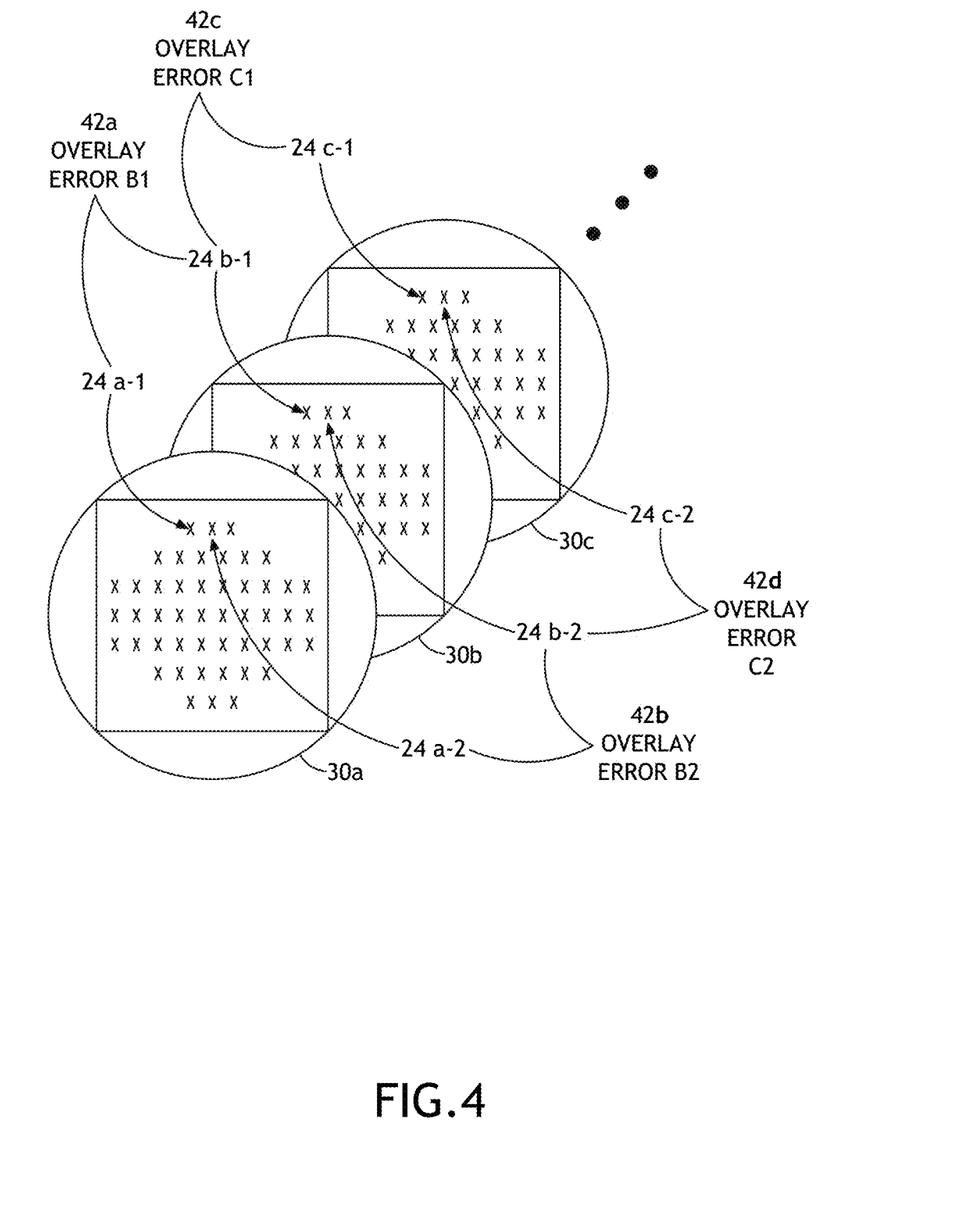
FIG. 4 is a conceptual illustration of the determination of overlay errors in the successive integrated circuit fabrication process.

FIG. 3 is a conceptual illustration of three successive process layers 30a-c in an integrated circuit device fabricated on a semiconductor wafer. FIG. 4 is a conceptual illustration of the determination of overlay errors in the integrated circuit fabrication process. Each layer includes similar metrology targets, which normally vary in position from layer to layer. However, the desired alignment between the metrology targets from layer to layer is known and may be used to monitor and correct the IC fabrication process from lot to lot, wafer to wafer, or layer to layer as the layers are processed. An overlay error determined by the metrology system therefore represents the relative misalignment between two or more metrology marks in successive layers.

To illustrate a few simple examples, FIG. 4 calls out two metrology targets on the first layer A, metrology target 24a-1 at location (X1a, Y1a) in layer A, and metrology target 24a-2 at location (X2a, Y2a) in layer A. Similarly, FIG. 4 calls out two metrology targets on the second layer B, metrology target 24b-1 at location (X1b, Y1b) in layer B, and metrology target 24b-2 at location (X2b, Y2b) in layer B; and two metrology targets on the third layer C, metrology target 24c-1 at location (X1c, Y1c) in layer C, and metrology target 24c-2 at location (X2c, Y2c) in layer C. FIG. 4 calls out the overlay error 42a representing the positional misalignment between the metrology target 24a-1 in layer A and the metrology target 24b-1 in layer B. Similarly, the overlay error 42b represents the positional misalignment between the metrology target 24a-2 in layer A and the metrology target 24b-2 in layer B. The overlay error 42c represents the positional misalignment between the metrology target 24b-1 in layer B and the metrology target 24c-1 in layer C; and the overlay error 42d represents the positional misalignment between the metrology target 24b-2 in layer B and the metrology target 24c-2 in layer C. In this manner, a complete matrix of overlay errors may be computed for each integrated circuit fabricated on a wafer through a series of process layers.

Moreover, the overlay errors measured over time, for example, represented by multiple lots of wafers, are computed, stored in a parameter database, and used for analysis and control. The corresponding applied process control parameters, measured parameters, and revised process control parameters are also computed, stored in the parameter database, and used for analysis and control. This provides access to historical data as well as real-time data or near real-time data for process control analysis and use in establishing and modifying the process control parameters through associated feedback control parameters (e.g., EWMA lambdas). In particular, the actual parameters applied by the scanner or stepper (e.g., translation, rotation, magnification, dose and focus) may be controlled indirectly through changing the specification of the weighting parameters (e.g., EWMA lambdas) used to weight the measured parameters and/or overlay errors, reflect cross-correlations, and aggregate the weighted components into the measured parameters reflecting composite adjustments to the process control parameters in an autoregressive, multi-variable feedback control scheme.

Figure 5:
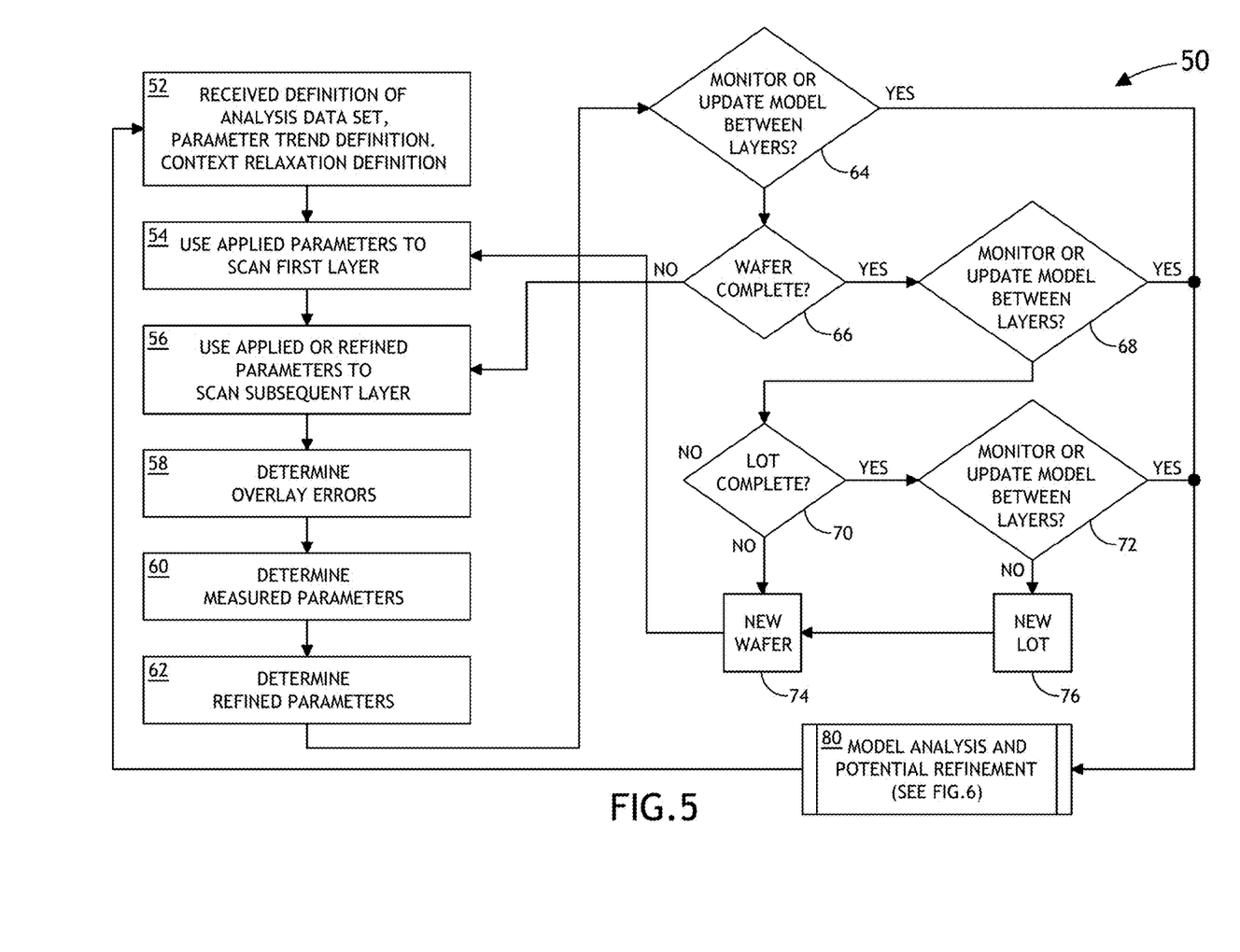
FIG. 5 is a logic flow diagram illustrating a process for monitoring the feedback control process in the integrated circuit fabrication process.

FIG. 5 is a logic flow diagram illustrating a routine 50, which provides one illustrative example of a process for monitoring the feedback control process in the integrated circuit fabrication process. The following description will also refer to the system components shown in FIG. 1. In step 52, the APC system 15 receives a definition of an analysis data set, parameter trend definitions, and/or context relaxation scenario definitions, for example from a user station 17 through an appropriate graphical user interface. Step 52 is followed by step 54, in which the process tool (photolithographic scanner or stepper) 12 uses a set of applied process control parameters to scan a first layer of an IC pattern onto a silicon wafer. The applied process control parameters include at least one of the translation rate of the wafer across the scanner or stepper, the rotation angle of the wafer with respect to the scanner or stepper, the dose of radiation applied to the wafer by the scanner or stepper, the magnification of the source pattern (reticle) by the scanner or stepper, and the focus of the source pattern onto the wafer by the scanner or stepper. The analysis data set includes one or more of these process control parameters selected for monitoring and potential use in feedback control.

Step 54 is followed by step 56, in which the process tool (photolithographic scanner or stepper) 12 uses a set of applied process control parameters to scan a subsequent layer of an IC pattern onto a silicon wafer. Now that there are two layers, the overlay error associated with the two process layers can be determined (see FIGS. 2-4). Step 56 is followed by step 58, in which the measurement system 13 (metrology system 18) determines the overlay errors between the scanned layers. Step 58 is followed by step 60, in which the process model (e.g., statistical process control model) 14 determines measured parameters based on the overlay errors. The measured parameters represent potential corrections to the process tool 12 (i.e., process control parameters, such as translation, rotation, dose, magnification, and focus) to counteract the overlay errors. At this point, the measured parameters do not reflect overall adjustments to the process control parameters, but instead reflect potential corrections to the process control parameters computed at each metrology target location. Therefore, step 60 is followed by step 62, in which the parameter monitoring and control system 15 (APC system) computes overall adjustments to the process control parameters based on the applied process control parameters, the measured parameters, historical values for these items and/or the overlay errors, and the feedback control parameters (EWMA lambdas) in an autoregressive, multi-variable feedback control scheme.

These adjustments are reflected in revised process control parameters, which are ordinarily supplied to the scanner or stepper automatically for use in scanning the next successive layer of the wafer being fabricated. However, the present invention provides an opportunity to monitor the process control parameters and measured parameters and potentially revise the feedback control parameters, at any point in the manufacturing process. Model refinement may be implemented in accordance with programmed logic, for example, between layers, between wafers, or between lots of wafers. In addition, model refinement may be implemented on an as-needed basis at any other time determined by system engineers, who are informed by the statistical monitoring data and associated graphs, trends, context relaxation scenarios, and feedback control parameter optimization.

To illustrate the model refinement feature of the APC system, step 62 is followed by step 64, in which the APC system determines whether it has been configured to update the APC model between layers. If the APC system has been configured to update the APC model between layers, the "yes" branch is followed from step 64 to routine 80 for model analysis and potential refinement. Routine 80 is described in greater detail with reference to FIG. 6. If the APC system has not been configured to update the APC model between layers, the "no" branch is followed from step 64 to step 66, in which in which the APC system determines whether the scanning process for the current wafer has been completed (i.e., all layers have been applied for the current wafer). If the scanning process for the current wafer has not been completed, the "no" branch is followed from step 66 to step 56, in which the scanner or stepper applies another layer, this time using the refined process control parameters.

If the scanning process for the current wafer has been completed, the "yes" branch is followed from step 66 to step 68, in which in which the APC system determines whether it has been configured to update the APC model between wafers. If the APC system has been configured to update the APC model between wafers, the "yes" branch is followed from step 64 to routine 80 for model analysis and potential refinement. If, on the other hand, the APC system has not been configured to update the APC model between wafers, the "no" branch is followed from step 68 to step 70, in which in which the APC system determines whether the scanning process for the current lot of wafer has been completed (i.e., all layers have been applied for the last wafer in the current lot of wafers). If the scanning process for the current lot of wafer has not been completed, the "no" branch is followed from step 70 to step 74, in which a new wafer is provided to the scanner or stepper. Step 74 is followed by step 54, in which the scanner or stepper applies the first layer to the new wafer.

If the scanning process for the current lot of wafer has been completed, the "yes" branch is followed from step 70 to step 72, in which in which the APC system determines whether it has been configured to update the APC model between lots of wafers. If the APC system has been configured to update the APC model between lots of wafers, the "yes" branch is followed from step 72 to routine 80 for model analysis and potential refinement. If, on the other hand, the APC system has not been configured to update the APC model between lots of wafers, the "no" branch is followed from step 72 to step 76, in which a new wafer lot is initiated and step 74 in which the first wafer in the new lot is provided to the scanner or stepper. Step 74 is then followed by step 54, in which the scanner or stepper applies the first layer to the new wafer of the new lot.

While procedures for automatic model refinement are described above, it should also be understood that the system allows the technicians to monitor the manufacturing process continually and then elect to implement model refinement at any appropriate time. The APC system may also implement a combination of these techniques, with automatic model updating used on an ongoing basis to automatically reflect measured overlay errors in the feedback control process, while also allowing user controlled model refinement from time to time on an as-needed basis, for example in response to the technicians identifying problematic process control through monitoring the statistical parameters computed and graphed by the APC and displayed on the user stations.

Figure 6:
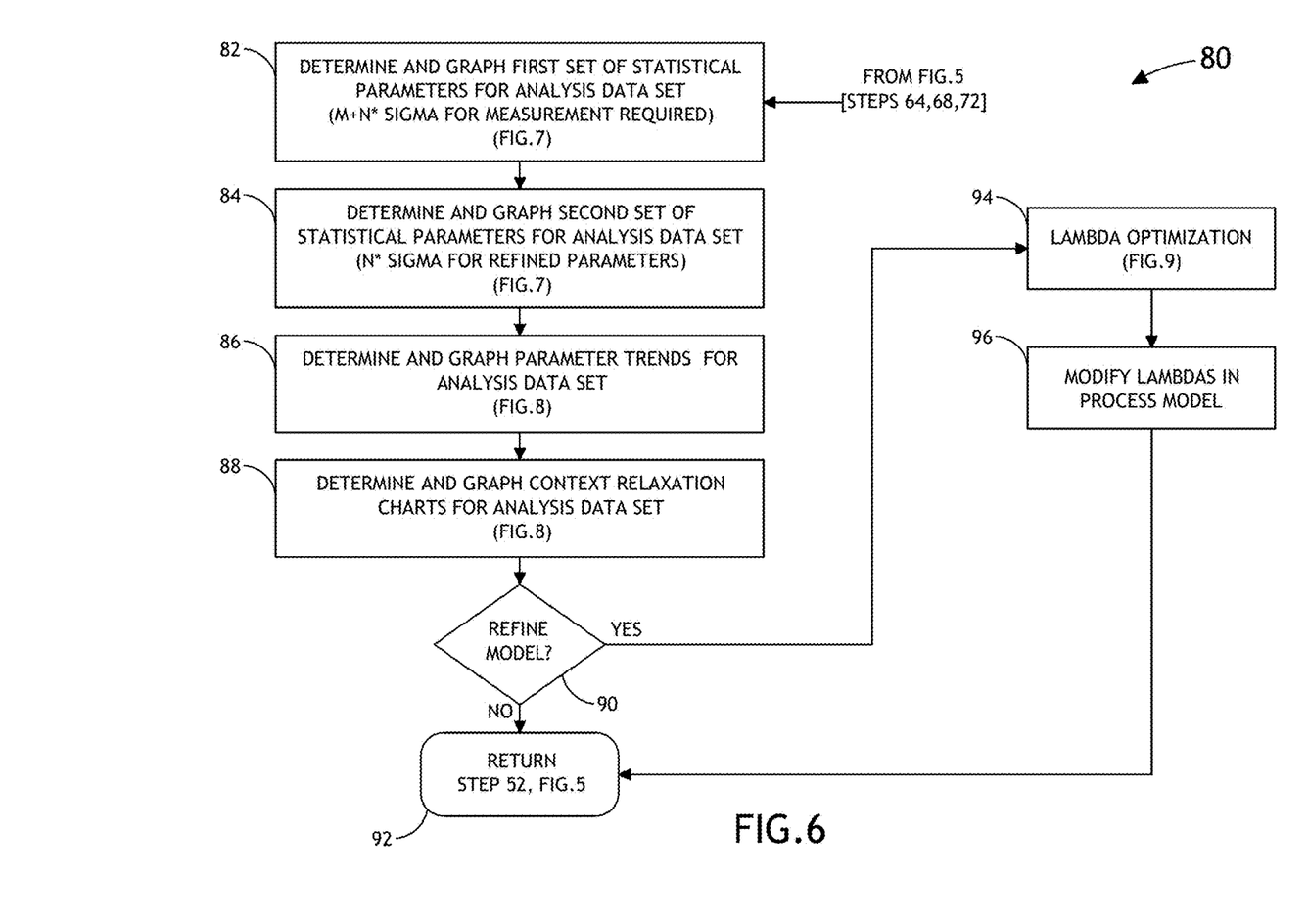
FIG. 6 is a logic flow diagram illustrating a process for displaying statistical parameters and implementing a feedback control process in the integrated circuit fabrication process.
Figure 7:
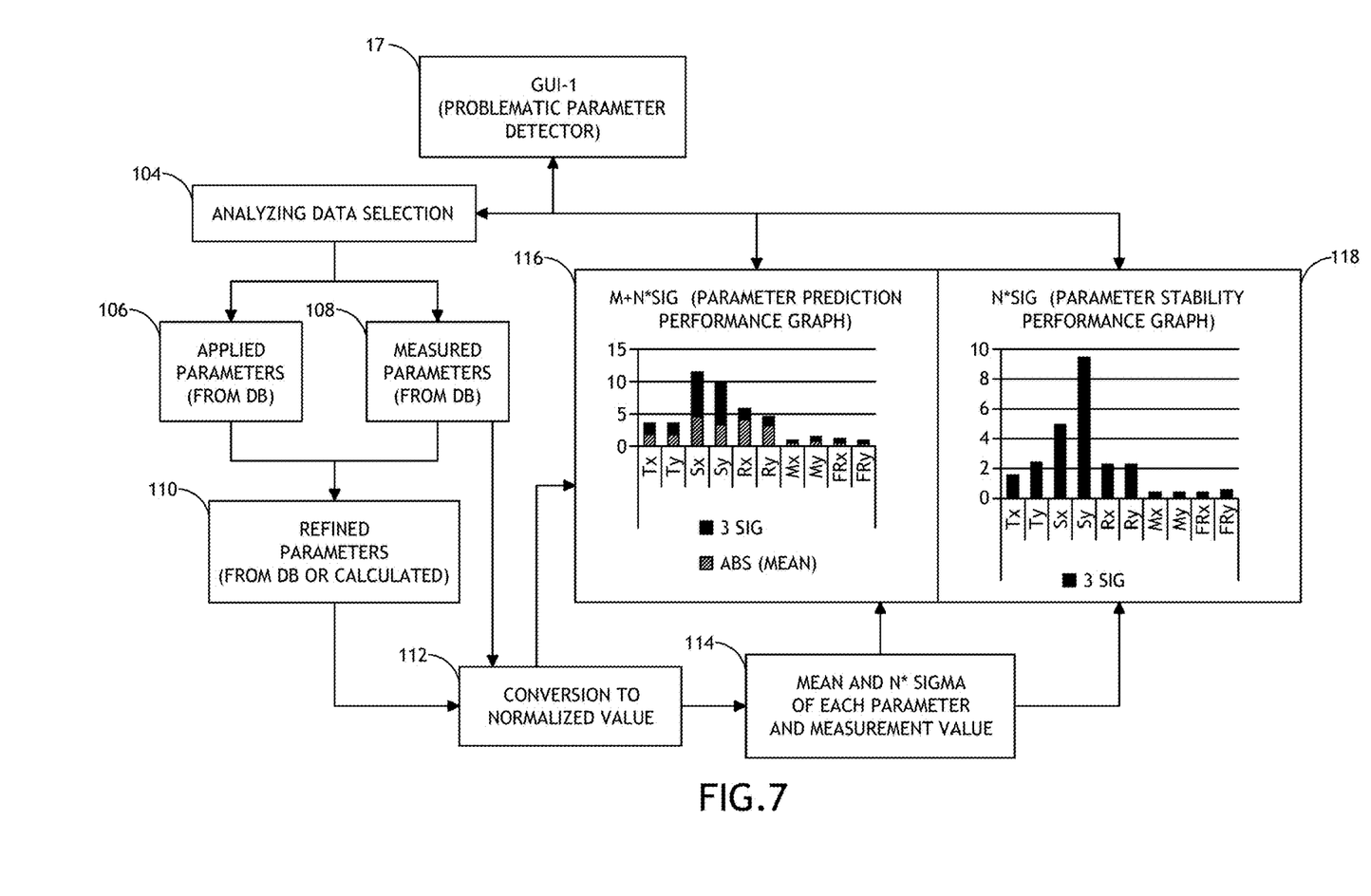
FIG. 7 is a conceptual block diagram of computation and display of statistical parameters for monitoring the feedback control process in the integrated circuit fabrication process.
Figure 8:
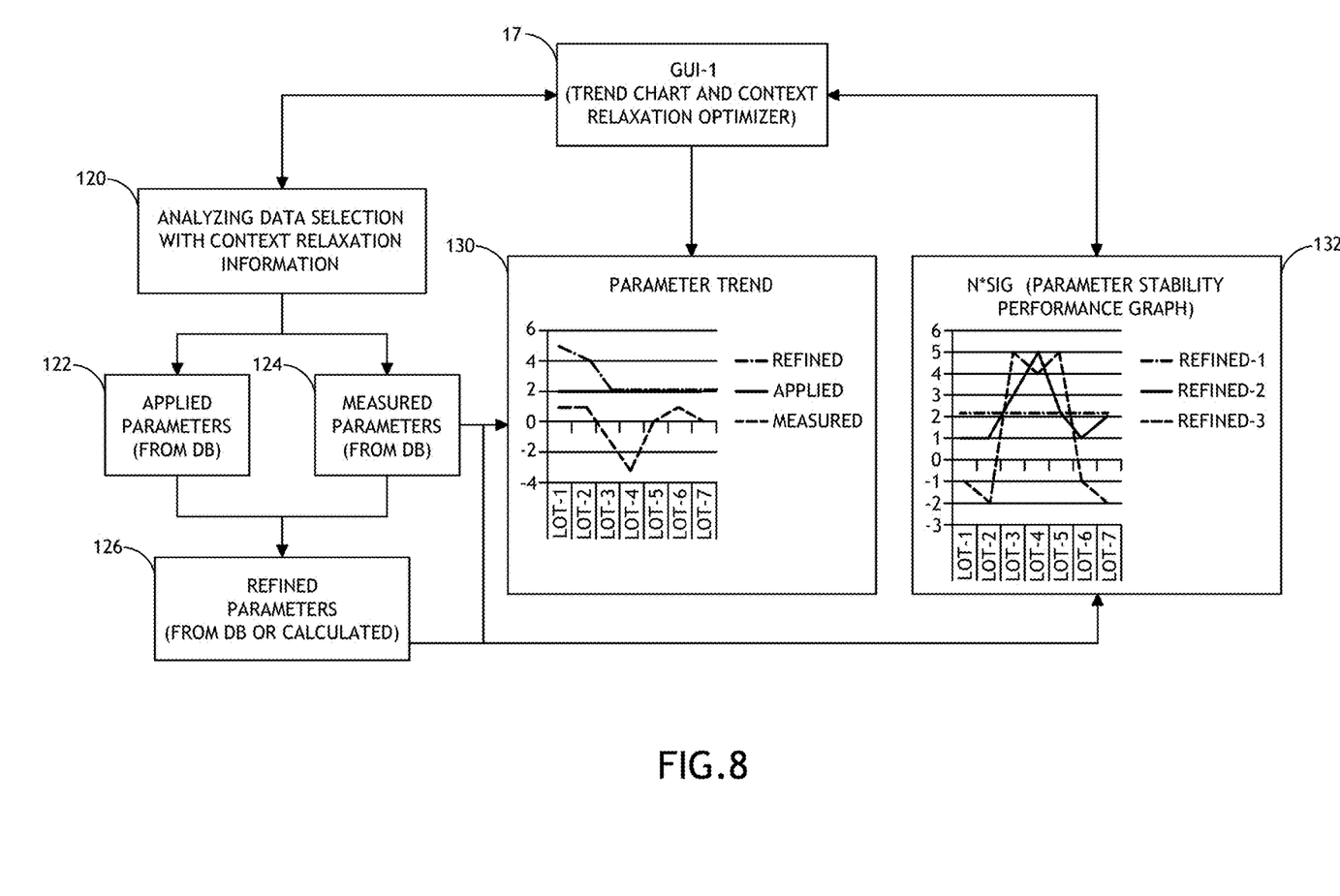
FIG. 8 is a conceptual block diagram of computation and display of trends and context relaxation scenarios for monitoring integrated circuit fabrication process.
Figure 9:
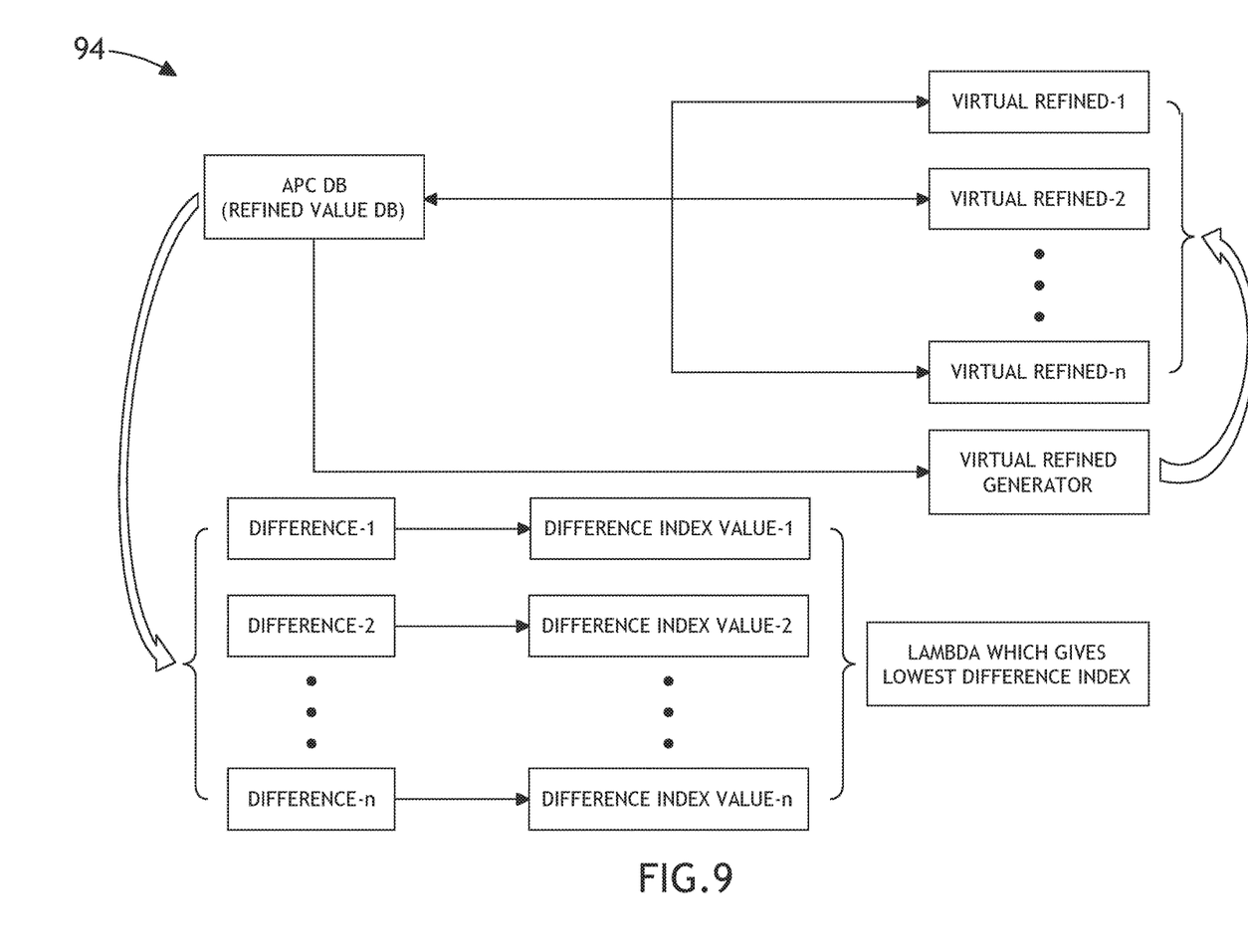
FIG. 9 is a conceptual block diagram of computation of adjustments to modeling parameters to implement feedback control of integrated circuit fabrication process.

FIG. 6 is a logic flow diagram illustrating routine 80 for displaying statistical parameters and implementing a feedback control process in the integrated circuit fabrication process. Routine 80 may be implemented by the APC system 15, the user station 17, and to some extent together with technician operation of the user station. FIGS. 7-9 further illustrate certain steps of routine 80 and, therefore, will be described in connection with the following description of Routine 80.

In step 82, which follows steps 64, 68, and 72 of FIG. 5, the APC system 15 determines and graphs a first set of statistical parameters for the analysis data set and displays the graph on the user station 17. Step 82 is followed by step 84, in which the APC system 15 determines and graphs a second set of statistical parameters for the analysis data set and displays the graph on the user station 17. FIG. 7 is a conceptual block diagram of Step 82 for computing and displaying of the first and second sets of statistical parameters for monitoring the feedback control process in the integrated circuit fabrication process. The APC system 15 (block 104) uses the analysis data set selected by the user through the user station 17 to define the process control parameters and/or measured parameters to be included in the first and second sets of statistical parameters. The APC system 15 obtains the applied process control parameters (block 106), the measured parameters (block 108), and the revised process control parameters (block 110) from the parameter database 16 maintained by the APC system. These items are converted to normalized values (block 112), for example, percent of mean (for process control parameters) and percent error (for measured parameters) or a common unit of measurement, such as nm. The APC system also computes the means and deviances (e.g., n*sigma, where "n" is a user-defined parameter, for example, 3, and sigma represents the standard deviation) of the normalized process control parameters and measured parameters (block 114).

The APC system then plots the first set of statistical parameters (block 116), in this example a bar chart showing the means plus the deviations (m+n*sigma) for the measured parameters in the analysis data set with separate "x" and "y" values shown for each for each measurement value on a common axis. The bar chart values are normalized so that the relative sizes of the means and deviances are displayed on a common scale, which allows them to be viewed and compared at a glance. The APC system also plots the second set of statistical parameters (block 118), in this example a bar chart showing the deviations (n*sigma) for the revised process control parameters in the analysis data set, again with separate "x" and "y" values shown for each for each process control parameter on a common axis. These bar chart values are also normalized so that the relative sizes of the deviances are displayed on a common scale allowing them to be viewed and compared at a glance.

The statistical analysis described above can be used to identify problematic process control parameters and/or problematic modeling parameters in the process model. For example, an unstable parameter is one example of a problematic parameter for an APC system. An unstable parameter may show a large distribution shape (large deviation over time) compared to a stable parameter. Displaying the bar charts showing the comparative deviations of the refined process control parameters (each bar representing n*sigma) allows a technician to easily identify problematic process control parameters. To facilitate the comparison, the values to be compared to each other on the bar chart are normalized, for example, by converting all of the units to percent of mean (for process control parameters), percent error (for measured parameters), or a standard unit, such as nm. Normalizing the values being compared allows them to be compared to each other directly at a glance.

Returning to FIG. 6, step 84 is followed by step 86, in which the APC system determines and graphs parameter trends for the analysis data set. Step 86 is followed by step 88, in which the APC system determines and graphs context relaxation scenarios for the analysis data set. FIG. 8 is a conceptual block diagram of computation and display of the trends and context relaxation scenarios for monitoring the integrated circuit fabrication process. The APC system obtains the analysis data set selection (block 120) from the user station 17 along with the applied process control parameters (block 122), the measured parameters (block 124), and the refined process control parameters (block 126) from the parameter database 16. The APC system also obtains (block 120) trend definition data (e.g., lots of wafers to include in the parameter trend graphs) from the user station 17. The APC system then graphs (block 130) the applied process control parameters, the measured parameters, and the refined process control for the specified wafer lots on a common axis. Block 130 shows the at-a-glance comparison for one illustrative process control parameter. It will be understood that a similar parameter trend graph can be computed for each process control parameter in the analysis data set and displayed separately and combined in various combinations on a single display image, as desired, to facilitate at-a-glance comparison of the parameter trends for the process control parameter in the analysis data set.

The APC system also obtains (block 120) context relaxation definition data (e.g., parameters to be relaxed in the context relaxation optimization graphs) from the user station 17. The APC system then graphs (block 132) the refined process control parameters according to the context relaxation scenario on a common axis. Block 132 shows the at-a-glance comparison for one illustrative process control parameter and one context relaxation scenario. It will be understood that a similar context relaxation graph can be computed for each process control parameter in the analysis data set and for each context relaxation scenario. These graphs can be displayed separately and combined in various combinations on a single display image, as desired, to facilitate at-a-glance comparison of the context relaxation scenarios.

Generally described, context relaxation may be a rule used to select groups of wafers or wafer layers to be used to calculate APC feedback among all of the historical wafer lots. There are often two main aspects analyzed through context relaxation. The first aspect is the identification of specific components to be used to select the historical lots out of all historical lots that will be included in the computation of the APC feedback control parameters (EWMA lambdas). To illustrate a few very simple examples, the context relaxation criteria to select groups of wafers may be "lots exposed to the same scanner or stepper"; "same layer"; "within specific days"; and so forth. The second aspect often analyzed through context relaxation is how to weight the various lots, wafers or layers to be used for calculation of the APC feedback control parameters. Various weighting schemes, typically discounting data based on age or other context parameters, may be selected as a matter of design choice. Once the lots, wafers, or layers to be used in the computation of the feedback control parameters have been identified, a preferred set of feedback control parameters may be determined (see FIG. 9 and the accompanying description). Additional aspects may be taken into account through context relaxation, such as excluding components when there is no historical lot to match the defined context relaxation rule, excluding data known to contain problematic parameters, and so forth.

Returning to FIG. 6, one possible approach to model refinement is provided to illustrate this process. Step 88 is followed by step 90, in which the APC system determines, for example through programmed logic and/or user instruction on an as-needed basis, whether to refine the APC model computing the feedback control parameters used to adjust the process control parameters based on the measured parameters. if APC model refinement is not called for, the "no" branch is followed from step 90 to the return step 92, in which the process returns to step 52 in FIG. 5 for receiving another analysis data set selection. If APC model refinement is called for, the "yes" branch is followed from step 90 to the return step 94, in which preferred lambdas are computed for the EWMA algorithm used by the APC model to compute the feedback adjustments to the process control parameters from the measured parameters. Step 94 is followed by step 96, in which the lambdas are updated in the EWMA algorithm used by the APC model to compute the feedback adjustments. Step 96 is followed by the return step 92, in which the process returns to step 52 in FIG. 5 for receiving another analysis data set selection.

FIG. 9 is a conceptual block diagram for step 94 for computing adjustments to the feedback control parameters, in this example, EWMA weighting parameters, to implement feedback control of integrated circuit fabrication process. Generally described, exponentially weighted moving average (EWMA) is a type of infinite impulse response filter that applies weighting factors which decrease exponentially. The weighting for each older datum point decreases exponentially, never reaching zero. The parameter "lambda" represents the degree of weighting decrease, a constant smoothing factor between 0 and 1. FIG. 9 illustrates a process in which a variety of candidate lambda sets are analyzed using historical process control parameters and measured parameter data sets from the parameter database 16. A difference index is defined for aggregating errors computed between the refined process control parameters computed using the candidate lambda sets and the actual data in the historical data. The candidate lambda set producing the lowest difference index is then selected for use in refining the APC model. More particularly, preferred EWMA lambdas may be selected through the iterative computation of difference indexes corresponding to virtual revised process control parameters computed from candidate lambda sets and a continually updated historical set of process control parameters and measured parameters occurring over time until the solution converges on a preferred set of lambdas. The preferred set of lambdas are then entered (fed back) into the APC model, where they are used to compute the revised process control from the measured parameters going forward.

The present invention may consist (but not required to consist) of adapting or reconfiguring presently existing systems. Alternatively, original equipment may be provided embodying the invention.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

At least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those often found in data computing/communication and/or network computing/communication systems.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages.

The form described is merely explanatory, and it is the intention of the following claims to encompass and include such changes.

The invention claimed is:

1. A system, comprising:
   a controller configured to communicatively couple to a process tool, wherein the process tool is controllable through a plurality of control parameters as inputs to the process tool, wherein the controller includes one or more processors configured to execute one or more program instructions configured to cause the one or more processors to:
   receive, from a user interface, a user-selected set of monitored control parameters of the plurality of control parameters;
   manipulate the plurality of control parameters with an automated process controller to fabricate a plurality of samples, wherein the automated process controller generates process control data used for fabricating the plurality of samples with a process control model, wherein the process control data include applied values of the plurality of control parameters utilized to adjust the process tool, parameter corrections to the applied values of the plurality of control parameters based on metrology data, and refined values of the plurality of process control parameters, wherein the process control model includes calculating the refined values of the plurality of control parameters for a current sample based on a subset of the process control data from previous runs defined by context relaxation definitions;
   display, on the user interface, normalized values of the process control data of the monitored control parameters over a user-selected historical interval for graphical comparison;
   receive for model refinement, from the user interface, at least one problematic control parameter of the monitored control parameters;
   receive, from the user interface, updated context relaxation definitions for calculating values of the at least one problematic process control parameter with the process control model; and
   modify the process control model used to control one or more subsequent runs of the process tool with the updated context relaxation definitions.

2. The system of claim 1, wherein calculating the refined values of the plurality of control parameters further comprises:
   weighting the subset of process control data from previous runs defined by the context relaxation definitions with a set of weighting parameters to generate a weighted set of parameter corrections; and
   calculating the refined values of the plurality of control parameters based on the weighted set of modeled parameter corrections.

3. The system of claim 2, wherein modifying the process control model for one or more subsequent runs with the updated context relaxation definitions comprises:
   modifying the set of weighting parameters.

4. The system of claim 3, wherein modifying the set of weighting parameters comprises:
   modifying at least one of the values of the set of weighting parameters or the number of weighting parameters within the set of weighting parameters.

5. The system of claim 3, wherein modifying the set of weighting parameters comprises:

receiving one or more candidate sets of weighting parameters from the user interface;

weighting the selected set of parameter corrections with the one or more candidate sets of weighting parameters to generate one or more candidate weighted sets of parameter corrections;

calculating one or more candidate sets of refined values of the plurality of control parameters based on the one or more candidate weighted sets of parameter corrections;

calculating one or more difference index values for the one or more candidate weighted sets of parameter corrections based on the one or more candidate sets of refined values of the plurality of control parameters; and modifying the set of weighting parameters to include the candidate set of weighting parameters associated with a lowest difference index value.

6. The system of claim 1, wherein displaying, on the user interface, normalized values of the process control data of the monitored control parameters over a user-selected historical interval for graphical comparison comprises:

converting the process control data of at least one of the parameter corrections or the refined values of each of the plurality of control parameters to a common scale;

generating one or more statistical parameters associated with the at least one of the parameter corrections or the refined values of each of the plurality of control parameters; and displaying, on the user interface, the one or more statistical parameters.

7. The system of claim 6, wherein the one or more statistical parameters include at least one of means or deviations of the parameter corrections.

8. The system of claim 6, wherein the one or more statistical parameters include deviations of the refined values of the plurality of control parameters.

9. The system of claim 6, further comprising:
displaying one or more graphs illustrating the one or more statistical parameters on the user interface.

10. The system of claim 9, wherein displaying one or more graphs illustrating the one or more statistical parameters on the user interface includes displaying the one or more statistical parameters on a common set of axes.

11. The system of claim 1, wherein displaying, on the user interface, normalized values of the process control data of the monitored control parameters over a user-selected historical interval for graphical comparison comprises:

displaying one or more graphs illustrating a trend associated with current and recorded values of the process control data on the user interface.

12. The system of claim 11, wherein displaying one or more graphs illustrating a trend associated with current and recorded values of the process control data on the user interface comprises:

displaying a trend of the parameter corrections based on the metrology data and a trend of the refined values of the plurality of control parameters on a single graph on the user interface.

13. The system of claim 1, wherein displaying, on the user interface, normalized values of the process control data of the monitored control parameters over a user-selected historical interval for graphical comparison comprises:

displaying one or more graphs illustrating one or more context relaxation scenarios based on at least one of the current or the recorded values of the process control data on the user interface.

14. The system of claim 1, wherein the plurality of control parameters comprises:

at least one of a translation parameter, a rotation parameter, a magnification parameter, a dose parameter, or a focus parameter.

15. The system of claim 1, wherein displaying the normalized values of the process control data of the monitored control parameters over a user-selected historical interval for graphical comparison on the user interface is initiated at a specified point of a production process.

16. The system of claim 1, wherein the specified point of the production process comprises:

at least one of between layers of a sample of the plurality of samples, between successive samples of the plurality of samples, or between lots of samples of the plurality of samples.

17. The system of claim 1, wherein displaying the normalized values of the process control data of the monitored control parameters over a user-selected historical interval for graphical comparison on the user interface is initiated by a user on the user interface.

18. The system of claim 1, wherein modifying the process control model for one or more subsequent runs of the process tool with the updated context relaxation definitions is initiated by a user on the user interface.

19. A system, comprising:
a metrology tool, wherein the metrology tool is configured to measure metrology data to characterize a process tool; and a controller communicatively coupled to a process tool and the metrology tool, wherein the process tool is controllable through a plurality of control parameters as inputs to the process tool, wherein the controller includes one or more processors configured to execute one or more program instructions configured to cause the one or more processors to:

receive, from a user interface, a user-selected set of monitored control parameters of the plurality of control parameters;

manipulate the plurality of control parameters with an automated process controller to fabricate a plurality of samples, wherein the automated process controller generates process control data used for fabricating the plurality of samples with a process control model, wherein the process control data include applied values of the plurality of control parameters utilized to adjust the process tool, parameter corrections to the applied values of the plurality of control parameters based on metrology data received by the metrology tool, and refined values of the plurality of process control parameters, wherein the process control model includes calculating the refined values of the plurality of control parameters for a current sample based on a subset of the process control data from previous runs defined by context relaxation definitions;

display, on the user interface, normalized values of the process control data of the monitored control parameters over a user-selected historical interval for graphical comparison;

receive for model refinement, from the user interface, at least one problematic control parameter of the monitored control parameters; and receive, from the user interface, updated context relaxation definitions for calculating values of the at least one problematic process control parameter with the process control model;

and modify the process control model used to control one or more subsequent runs of the process tool with the updated context relaxation definitions.

20. A method, comprising:

receiving, from a user interface, a user-selected set of monitored control parameters of a plurality of control parameters used as inputs to a process tool;

manipulating the plurality of control parameters with an automated process controller to fabricate a plurality of samples with the process tool, wherein the automated process controller generates process control data used for fabricating the plurality of samples with a process control model, wherein the process control data include applied values of the plurality of control parameters utilized to adjust the process tool, parameter corrections to the applied values of the plurality of control parameters based on metrology data, and refined values of the plurality of control parameters, wherein the process control model includes calculating the refined values of the plurality of control parameters for a current sample based on a subset of the process control data from previous runs defined by context relaxation definitions;

displaying, on the user interface, normalized values of the process control data of the monitored control parameters over a user-selected historical interval for graphical comparison;

receiving, from the user interface, at least one problematic control parameter including a subset of the monitored control parameters;

receiving, from the user interface, updated context relaxation definitions for calculating the at least one problematic process control parameter with the process control model; and modifying the process control model for one or more subsequent runs of the process tool with the updated context relaxation definitions.

21. The method of claim 20, wherein calculating the refined values of the plurality of control parameters further comprises:

weighting the subset of process control data from previous runs defined by the context relaxation definitions with a set of weighting parameters to generate a weighted set of parameter corrections; and calculating the refined values of the plurality of control parameters based on the weighted set of modeled parameter corrections.

22. The method of claim 21, wherein modifying the process control model for one or more subsequent runs with the updated context relaxation definitions comprises:

modifying the set of weighting parameters.

23. The method of claim 22, wherein modifying the set of weighting parameters comprises:

receiving one or more candidate sets of weighting parameters from the user interface;

weighting the selected set of parameter corrections with the one or more candidate sets of weighting parameters to generate one or more candidate weighted sets of parameter corrections;

calculating one or more candidate sets of refined values of the plurality of control parameters based on the one or more candidate weighted sets of parameter corrections;

calculating one or more difference index values for the one or more candidate weighted sets of parameter corrections based on the one or more candidate sets of refined values of the plurality of control parameters; and modifying the set of weighting parameters to include the candidate set of weighting parameters associated with a lowest difference index value.

24. The method of claim 21, wherein the set of weighting parameters includes exponentially weighted moving average lambda values.

25. The method of claim 20, wherein displaying, on the user interface, normalized values of the process control data of the monitored control parameters over a user-selected historical interval for graphical comparison comprises:

converting the process control data of at least one of the parameter corrections or the refined values of each of the plurality of control parameters to a common scale;

generating one or more statistical parameters associated with the at least one of the parameter corrections or the refined values of each of the plurality of control parameters; and displaying, on the user interface, the one or more statistical parameters.

26. The method of claim 25, wherein the one or more statistical parameters include at least one of means or deviations of the parameter corrections.

27. The method of claim 25, wherein the one or more statistical parameters include deviations of the refined values of the plurality of control parameters.

28. The method of claim 25, further comprising:

displaying one or more graphs illustrating the one or more statistical parameters on the common scale on the user interface.

29. The method of claim 20, wherein displaying, on the user interface, normalized values of the process control data of the monitored control parameters over a user-selected historical interval for graphical comparison comprises:

displaying one or more graphs illustrating one or more context relaxation scenarios based on at least one of the current or the recorded values of the process control data on the user interface.

30. The method of claim 20, wherein the plurality of control parameters comprises:

at least one of a translation parameter, a rotation parameter, a magnification parameter, a dose parameter, or a focus parameter.

31. A system, comprising:

a process tool, wherein the process tool is controllable through a plurality of control parameters as inputs to the process tool; and a controller communicatively coupled to the process tool, the controller including one or more processors configured to execute one or more program instructions configured to cause the one or more processors to:

receive, from a user interface, a user-selected set of monitored control parameters of the plurality of control parameters;

manipulate the plurality of control parameters with an automated process controller to fabricate a plurality of samples, wherein the automated process controller generates process control data used for fabricating the plurality of samples with a process control model, wherein the process control data include applied values of the plurality of control parameters utilized to adjust the process tool, parameter corrections to the applied values of the plurality of control parameters based on metrology data, and refined values of the plurality of process control parameters, wherein the process control model includes calculating the refined values of the plurality of control parameters for a current sample based on a subset of the process control data from previous runs defined by context relaxation definitions;

display, on the user interface, normalized values of the process control data of the monitored control parameters over a user-selected historical interval for graphical comparison;

receive, from the user interface, at least one problematic process control parameter including a subset of the monitored control parameters;

modify the process control model used one or more subsequent runs of the process tool with the updated context relaxation definitions.

* * * * *